Fig.2.

Inventor:
Alan Howard,
by Prowell S. Mack
His Attorney.

April 17, 1951 A. HOWARD 2,548,886
GAS TURBINE POWER PLANT WITH AXIAL FLOW COMPRESSOR
Filed Oct. 25, 1947 4 Sheets-Sheet 3

Inventor:
Alan Howard,
by Prowell S. Mack
His Attorney.

April 17, 1951     A. HOWARD     2,548,886
GAS TURBINE POWER PLANT WITH AXIAL FLOW COMPRESSOR
Filed Oct. 25, 1947     4 Sheets-Sheet 4

Inventor:
Alan Howard,
by *Prowell & Mack*
His Attorney.

Patented Apr. 17, 1951

2,548,886

UNITED STATES PATENT OFFICE 2,548,886

GAS TURBINE POWER PLANT WITH AXIAL FLOW COMPRESSOR

Alan Howard, Schenectady, N. Y., assignor to General Electric Company, a corporation of New York Application October 25, 1947, Serial No. 782,171

5 Claims. (Cl. 230—132)

This invention relates to internal combustion turbine powerplants of the type comprising an air compressor supplying air under pressure to a combustion chamber or "combustor" in which fuel is burned and from which the products of combustion, hereinafter called hot gases, are supplied to a turbine wheel, the turbine wheel driving the air compressor and the excess energy in the hot gases over that required to drive the air compressor being used to generate power. A gas turbine powerplant embodying my invention is well adapted for use in aircraft for propelling them, and it is this application of my invention which I have elected specifically to illustrate and describe. It is to be understood, however, that the invention is not limited necessarily to this use and also that certain features of the invention, while especially applicable to gas turbine powerplants, will find other applications.

The present application is a continuation-in-part of Serial No. 541,565, filed June 22, 1944, and this application relates particularly to the arrangement of the axial flow compressor employed.

In applying my powerplant to an aircraft, I may extract in the turbine wheel only sufficient energy from the gases to run the air compressor and certain auxiliaries appurtenant to the powerplant, such as a fuel pump, lubrication pump, generator, hydraulic regulator, etc., the remaining energy being utilized in a suitable propulsion nozzle to drive the aircraft. Alternatively, substantially all the energy may be utilized in the turbine wheel and the power thus extracted used to drive a conventional air-screw or other load device.

An object of the invention is to provide an improved axial flow compressor for a powerplant of the type described which is light, easy to manufacture and disassemble for inspection, cleaning, and other servicing, yet has the strength and life expectancy desired in high performance aircraft powerplants.

Another object is to provide an axial flow compressor rotor of the "disk type" having the improved critical speed characteristics ordinarily obtained only with the "drum type" rotor.

Other objects and advantages will be apparent from the following description, taken in connection with the accompanying drawings, in which.

Figures 1, 9, 10:
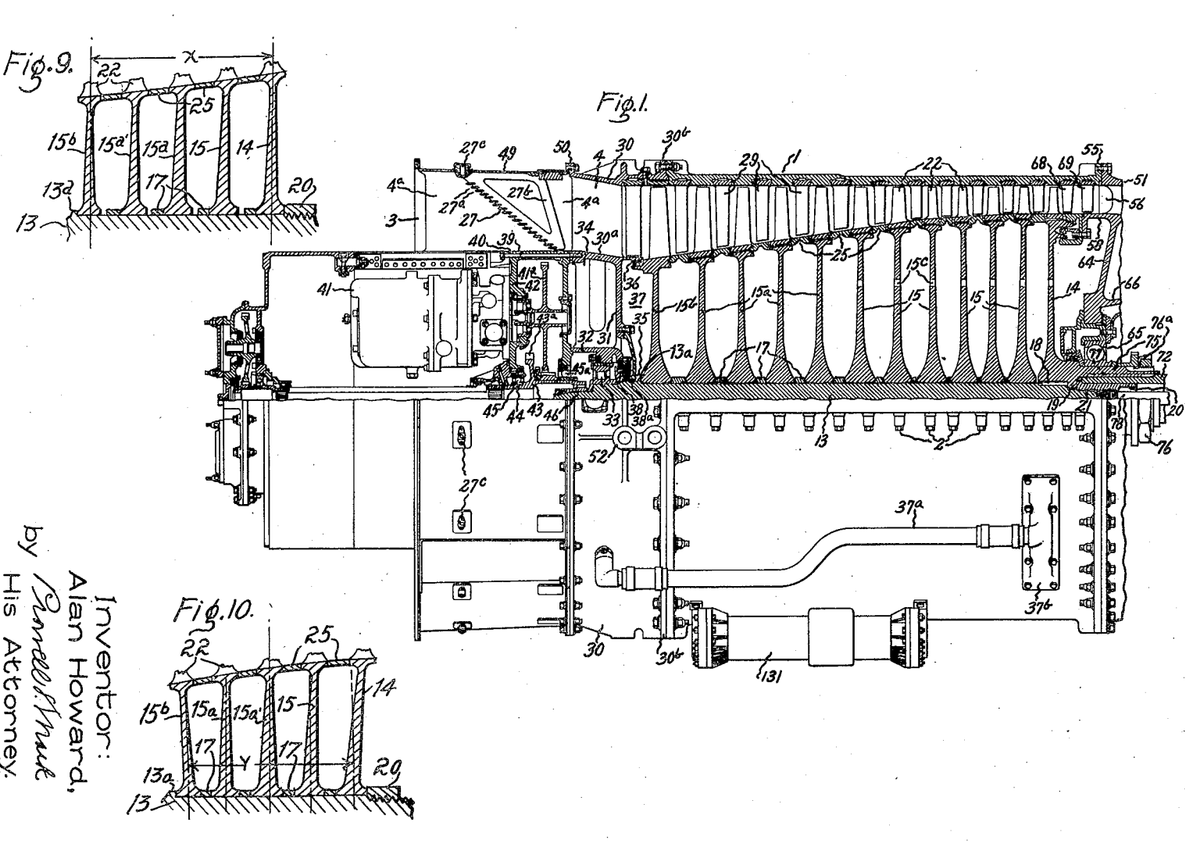
Fig. 1 is a longitudinal view, partly in section, of the compressor of a gas turbine powerplant
Figs. 9 and 10 are simplified schematic views illustrating one feature of construction of the compressor rotor.
Figure 2:
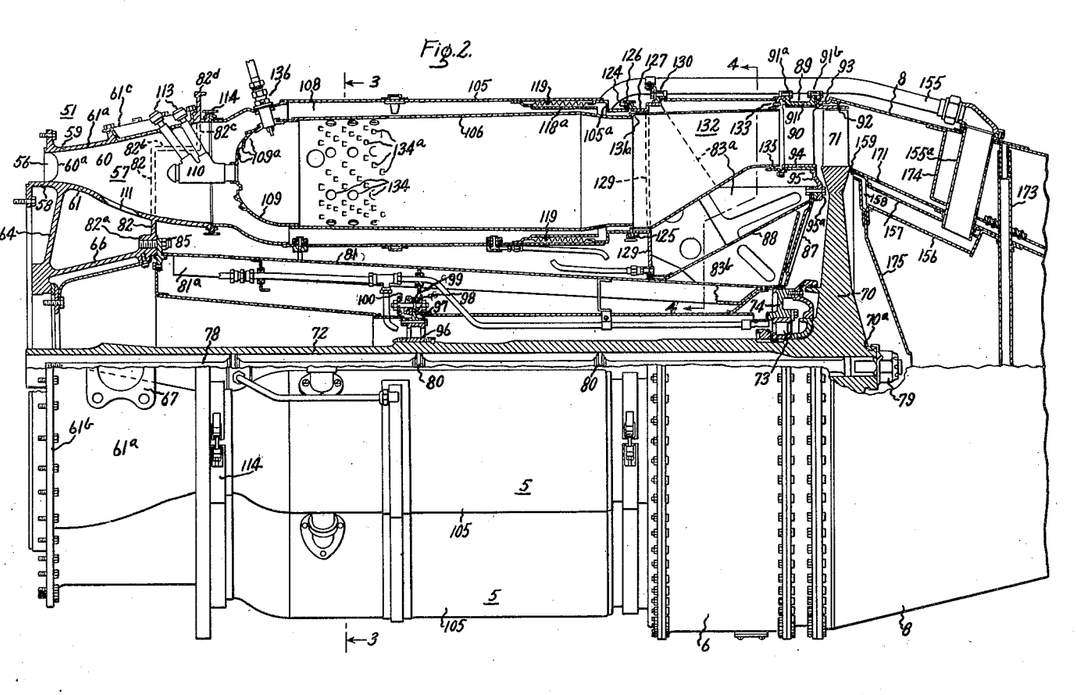
Fig. 2 is a view partly in section of the combustion and turbine section of the powerplant, Figs. 1 and 2 when placed end to end forming a continuous section through the powerplant.

Referring first to Fig. 1, I indicates the compressor stator casing which is split axially, the two halves being bolted together by flanges with threaded fastenings as indicated at 2. Air is supplied to the inlet end of the compressor through an annular passage 3 across which are three or more tubular streamlined struts 4. Ahead of struts 4 are hollow sheet-metal fairings 4a, which serve to "streamline" the struts 4 and through which pass certain oil and electrical conduits (not shown). Air from the compressor is supplied to a plurality of circumferentially spaced combustion chambers or combustors 5 (Fig. 2) which generate hot gases for a turbine wheel located in an aft frame casing 6, which may be split axially and bolted together or it may be formed as an integral cylinder, as shown in Fig. 2. Bolted to the rear side of casing 6 is an exhaust cone assembly, the outer wall of which is indicated at 8.

The axial flow compressor rotor is of the so-called "disk type" and comprises a shaft 13, a last stage disk 14, which may be termed a driving disk and which is preferably formed of a suitable alloy steel, and a plurality of disks 15 in advance of the last stage wheel, which may also be formed from steel to withstand the high temperatures of the compressed fluid. The disks 15a adjacent the inlet end may be fabricated of magnesium, aluminum, or other suitable light metal. The disks 15, 15a, 15b are shrunk onto the shaft, the first stage disk 15b being positioned by a collar 13a on the shaft. It is to be noted that these disks are not keyed to the shaft, the only connection with the shaft being the aforesaid shrink fit. The driving disk 14 is shrunk in place on the shaft and is also fastened by a spline or plurality of keys 18. Thus disk 14 is fixed to the shaft with a positive driving connection. The hub of disk 14 is provided with an annular inwardly projecting flange 19 which fits against a shoulder on the shaft 13 and is held by a cylindrical nut 20 having in the right-hand end thereof a hexagonal wrench socket. Nut 20 threads onto a short thread 21 on the end of the compressor shaft 13.

Figure 6:
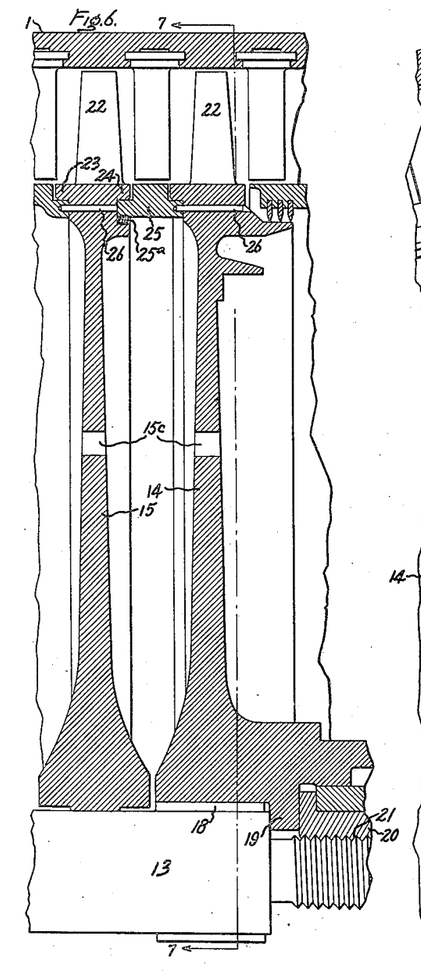
Fig. 6 is a detail sectional view to an enlarged scale of adjacent compressor disks.
Figure 7:
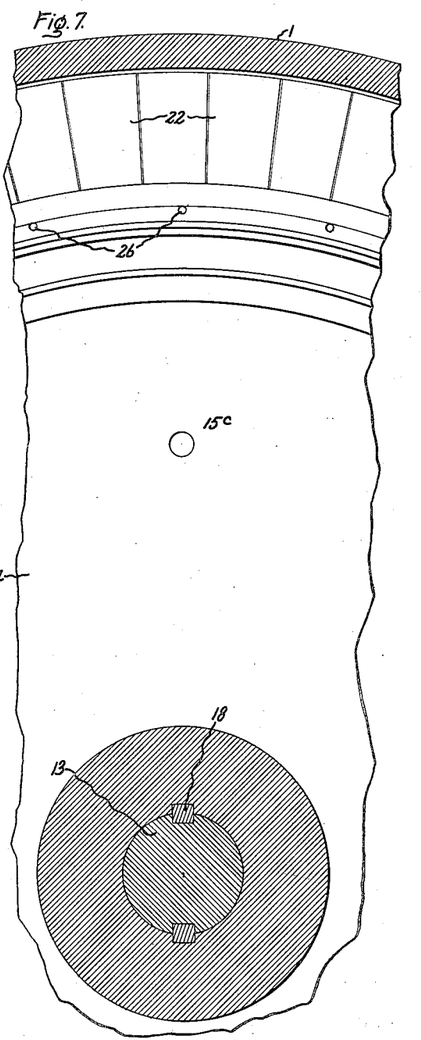
Fig. 7 is a sectional view taken on the plane 7—7 in Fig. 6.

Each compressor disk has a ring of blades 22 of suitable airfoil shape attached to the wheel rim in any suitable manner. The rims of adjacent disks are spaced axially apart and are provided with rabbets on opposite sides to form inwardly facing shoulders 23 and 24 (see Figs. 6 and 8). Connecting each pair of adjacent shoulders are spacer rings 25 each of which has a shrink fit with the shoulders and on one side is secured circumferentially by a plurality of spaced pins 26. Spacer rings 25 are of a shape, size, and material such that they are not "self-supporting"; so that at high speeds, of the order of 10,000 R. P. M. for a rotor about 24 inches in overall diameter, they expand under the action of centrifugal force into tighter frictional engagement with shoulders 23 and 24.

In assembling the rotor, the first stage disk 15b may be heated, assembled on the shaft, against collar 17 and permitted to shrink tightly into place on the shaft. Then the first spacer ring 25 is cooled, by packing in a refrigerant like "dry ice" for example, and positioned with its inner edge under the adjacent disk shoulder 24. The spacer ring 25 is then permitted to rise to the temperature of the wheel, so that it expands more tightly against the inwardly facing surface of shoulder 24. A central spacer ring 17 is then assembled on the shaft. Next, the second stage disk is shrunk into position by heating, its shoulder 23 being brought into engagement with the other side of spacer ring 25, following which the pins 26 may be driven into suitable drilled holes. Now the successive spacer rings 17, 25 and wheels 15a, 15, may be positioned one after the other until finally the last stage wheel 14 is positioned on spline 18 and locked firmly by nut 20. To further improve the frictional force between spacers 25 and the respective disk rims, a serrated stainless steel calking strip 25a may be peened into an annular groove in the disk rim, as may be seen in Fig. 8. With this arrangement, the rims of the several wheels are firmly held together so that substantially the entire torque between adjacent disks is taken by the friction between the mating shoulders of the spacer rings and disks. Part of this friction comes from the shrink fit between the disks and spacers, part from the axial compression between the sides of the wheel rims and the edges of the spacer rings, part is due to the calking strips 25a, and a considerable portion from the increase in friction between the wheel rims and the spacer rings at high speeds due to the above-mentioned expansion of the spacer rings by centrifugal force. Furthermore it is to be noted that the disks are so dimensioned that the aggregate axial distance between the hubs of the first and last stage wheels, i. e. the sum of the axial thicknesses of the disk hub portions and spacers 17, is slightly less than the corresponding dimensions for the disk rim portions and spacers 25, so that in the final assembled condition the disks take a "dished" shape, with the web portions deflected away from a radial plane. Then under the action of centrifugal force the disks tend to straighten so as to lie in exactly a radial plane, thus increasing the axial compression between the sides of the wheel rims and hence improving the torque-transmitting friction between these parts.

The feature described immediately above is illustrated in a simplified diagrammatic manner in Figs. 9 and 10. In order not to complicate the drawing unnecessarily, only five compressor disks have been represented. In Fig. 9, the five disks 14, 15, 15a, 15a', 15b are shown in the initial undistorted position on shaft 13 with the respective spacer rings 25 contacting the rim portions of the respective pairs of adjacent disks, while the hub spacer rings 17 form substantial clearances with the adjacent disk hubs. In this condition the web portions of the respective disks lie in parallel radial planes. If now the hub portions of the end disks 14, 15b be forced axially toward each other, as for instance by tightening the nut 20, the wheel hub portions will approach each other, to limiting positions determined by the axial thickness of the spacers 17, until the configuration shown in Fig. 10 is assumed. It will be apparent that axial compression of the hubs has resulted in the end disks assuming a somewhat conical or "dished" shape relative to the radial planes indicated by dotted lines in Fig. 10, representing the original position of the center lines of the respective disks. It will also be apparent that the middle disk 15a remains undistorted in a radial plane. In an actual case, as with the twelve-disk rotor shown in Fig. 1, it would not necessarily be expected that the disk at the middle of the stack be exactly radial. As a matter of fact, none of the disks may remain in exactly a radial plane, and the most nearly radial one may or may not be exactly at the middle of the stack, depending on the size and shape of the cross sections of the respective disks, the characteristics of the materials of which they are made, and many other factors in the mechanical design of the rotor. The important criterion is that some or all of the disks are pre-stressed to a somewhat dished configuration in the assembled position, with resulting increased stiffness of the rotor structure and increased axial compression between the rim portions and the edges of the respective spacers 25.

The distortion of the disk webs has been greatly exaggerated in Fig. 10 for purposes of clarity. Actually, the total change in the center-to-center distance between the hub portions of the end disks may be only on the order of .06 inch in a rotor where the total distance between the end disks is of the order of 30 inches.

It will be seen that the structural requirement which must be met in order to obtain the above-described effect is that the sum of the axial thicknesses of the disk hub portions and associated spacers 17, measured from the center of the hub of end disk 14 to a corresponding point of the other end disk 15b (as indicated by the dimension Y in Fig. 10), is smaller, in the assembled relation shown in Fig. 10, than the corresponding center-to-center distance of the rim portions and spacer rings 25 (indicated by the dimension X in Fig. 9).

It may also be noted that the illustrative method of assembly outlined in connection with diagrammatic Figs. 9, 10, in which the nut 20 is drawn up to compress the hub portions into engagement with one another, differs slightly from the shrink-fitting method of assembly described previously. In an actual arrangement where the disks are successively heated, pressed into position, and permitted to shrink tight to the shaft 13, the webs will progressively assume their final "dished" condition as additional disks are added. On the other hand, if the disks are not shrunk to the shaft 13, then the simplified method of assembly described in connection with Figs. 9, 10 might be used. It will also be observed that with the arrangement illustrated in Figs. 1, 9, 10, the suitably dimensioned hub spacers 17, help to determine the amount of "dish" which will be forced into each wheel in the finally assembled condition.

From Fig. 10 it will be obvious how the tendency of the disk webs to return to an exactly radial plane under the influence of high centrifugal forces (at speeds of the order of 10,000 R. P. M.) will increase the axial compression between adjacent rim portions and the edge surfaces of the rim spacers 25. Thus the friction between the rim portions, and therefore the torque transmitting capacity between disks, is increased as speed and centrifugal force increases.

It may be noted further that the wheel hub portions need not be forced into direct engagement with each other, as is illustrated in the parent application, Serial No. 541,565, in which case the amount of "dish" put into each wheel is determined by the final position of nut 20 and the geometrical shape and physical properties of the disks.

Figure 8:
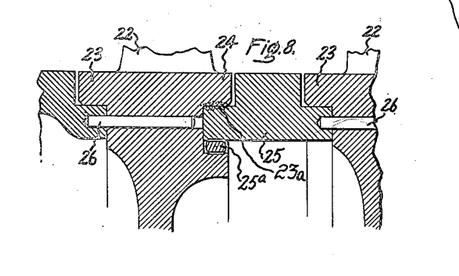
Fig. 8 is a fragmentary view on a still larger scale of a part of the compressor construction shown in Figs. 6 and 7.

To further increase the torque transmitting capacity of the joints between adjacent disks, the mating surfaces of the wheel shoulders and spacers 25 may be covered sparsely with emery dust or similar abrasive material before they are shrunk together, as shown at 23a in Fig. 8. With this arrangement, the emery dust particles firmly embed themselves in both faces, thus greatly increasing the friction. The emery dust may be advantageously applied to the surfaces by dispersing the particles in some very thin carrier such as a suitable lacquer, which is then painted on the surfaces.

With this arrangement, the drive is primarily from the shaft, through the keyed hub of the last stage wheel 14, to the rim of the wheel 14, and thence through the rims of the successive wheels. Thus there is provided a compressor rotor construction which is comparatively easy to assemble and dismantle for servicing and which avoids the need for keyways in the shaft and key means for positively fixing all the wheels to the shaft. This results in a rotor which can be built at relatively low cost and upon which wheels can be replaced with comparative ease. It is also found that the "pre-stressing" of the disks obtained with the above-described dished arrangement effects a very material improvement in the stiffness of the rotor, making it compare favorably to a "drum type" rotor in its critical speed characteristics. Thus my arrangement obtains a very important advantage of the drum type rotor while retaining the superior strength and ease of manufacture of the disk type rotor.

Carried by compressor stator casing 1 and attached to it in any suitable way are circumferential rows of stationary compressor blades 29. Compressor casing 1 is provided with two sets of stationary blades 68 and 69 which serve to straighten out the air flow and direct the air in an even smooth stream to the transition passages 57.

In each of the high pressure stage disks 15 are a plurality of circumferentially spaced "balancing" or "breather" holes 15c for preventing accumulated gas pressure between adjacent disks from deflecting the rather thin web portions axially.

For balancing the axial thrust on the rotor caused by the aerodynamic forces on the blades 22, a conduit 37a extracts air under pressure from a manifold 37b and delivers it to the chamber 37, described more particularly hereinafter.

The ends of the streamlined struts 4 are formed integral with and are carried by outer and inner walls 30 and 30a, outer wall 30 having a rear flange bolted to the forward compressor stator casing flange as indicated at 30b. Carried by inner wall 30a is a radially inwardly extending end wall 31 which at its inner portion carries an axially projecting sleeve 32 which forms a housing and support for a roller bearing 33, in which the forward end of shaft 13 is carried. Sleeve 32 is connected to walls 30a and 31 and is reinforced by a plurality of spaced radially extending webs 34. The opening in end wall 31 through which shaft 13 projects is sealed by a suitable labyrinth packing member 35. At its periphery the first stage wheel 15b is sealed with respect to wall 30a by a labyrinth type packing 36. This serves to define between the first stage wheel 15b and casing end wall 31 a sealed balancing chamber 37. At 38 is a labyrinth member cooperating with a ring 38a to form a double labyrinth oil seal for the forward bearing housing.

Members 4, 30, 30a, 31, 32, 34 together comprise the "forward frame".

Attached to the front edge of wall 30a by a ring of bolts 39 is an accessory casing assembly including walls which define a gear casing 40, in which is located suitable gearing for driving the several auxiliaries. One of these auxiliaries is indicated at 41, which represents a hydraulic fuel control regulator driven by gear 41a from the multiple pinion 43. These auxiliaries and the arrangement for driving them are not shown in complete detail as their specific arrangement forms no part of the present invention. They may be carried by the front wall 42 of the gear casing. The common multiple driving pinion 43 for the gearing is carried by a sleeve 44 mounted in suitable ball bearings 45, 45a. Sleeve 44 is connected to shaft 13 by a toothed or splined coupling 46. A suitable starting motor (not shown) may be mounted on the front casing wall 42 with a pinion engaging the large diameter portion 43a of the multiple pinion 43. A lubricating oil cooler 131 may be secured to the compressor stator casing as shown in Fig. 1.

A "forward air guide" in the form of an annular wall 49 is bolted to wall 30 at flange 50, and encloses an air inlet screen 27, comprising concentric sectional arcuate rings 27a supported on a plurality of spaced radial ribs 27b between the respective fairings 4a. The sectional air inlet screens 27 are held to the forward air guide 49 by quick detachable fasteners 27c, and can be readily removed for cleaning, inspection, or other servicing. At its discharge end, compressor casing 1 is provided with a flange 55 to which is bolted a unitary casing structure or "mid-frame" indicated generally at 51 and having walls including a forward portion defining an annular air discharge passage 56 from which lead transition passages 57 for conveying air from the compressor to the several combustion chambers. The forward portion of the walls which define passage 56 are indicated at 58 and 59 in Fig. 2, being inner and outer annular walls fixed in spaced relation by the circumferentially spaced radially extending walls 60, which are the "side walls" of the transition passages 57. These walls 60 converge to a vertex indicated by the line 60a in Fig. 2, there being, of course, one such vertex between each pair of adjacent transition passages. Each passage 57 is formed by concentric walls 61, 61a which at their inlet end define an arcuate opening and which form the admission end converge in a circumferential direction and diverge in a radial direction and terminate at a circular flange 61b. In other words, the walls 60, 61, 61a are shaped to provide transition passages 57, which are elongated in a circumferential direction at their inlet ends and circular at their discharge ends. The lower half of Fig. 2 shows in elevation the walls 61a and indicates the manner in which they converge toward the flange 61b.

Formed integral with inner wall 58 is an inwardly extending end wall 64 in which is carried a mid-bearing 65 for supporting the rear end portion of compressor shaft 13. End wall 64 and walls 61 are reinforced by an axially extending wall 66 connected to a rear end wall 82. Thus there is provided an integral mid-frame casing comprising end walls 64, 82 the walls which form air passages 56 and 57, and wall 66, which casing is very rigid and is attached to the compressor stator casing 1 as a unit, thus providing a strong rigid integral ring structure at the discharge end of the longitudinally split compressor casing. At the juncture of walls 66, 82 is an attachment flange 82a, the purpose of which will be seen hereinafter.

Circumferentially spaced around the mid-frame casing 51 are a plurality of pads 67 to which suitable attaching devices may be bolted for supporting the powerplant. Thus the comparatively heavy rigid mid-frame casing 51 serves as the "backbone" of the powerplant and is located substantially at the center of gravity of the complete powerplant.

It is convenient to support the weight of the powerplant from this mid-frame casing, with a third point of support provided by an attachment fitting connected to a pad such as that indicated at 52 at the forward end of the compressor casing, which pad may be conveniently formed integral with the forward frame. A similar pad may be located at the rear of the engine near turbine casing flange 130.

The walls 61, 64, 66, 82 form an annular header or manifold, to which is supplied air under pressure through circumferentially spaced openings 111 in the wall 61, there being an opening 111 in each transition passage. High pressure air may be extracted from this manifold by suitable conduits (not shown) for such various purposes as turbine wheel cooling, cabin pressurizing, etc.

Figure 3:
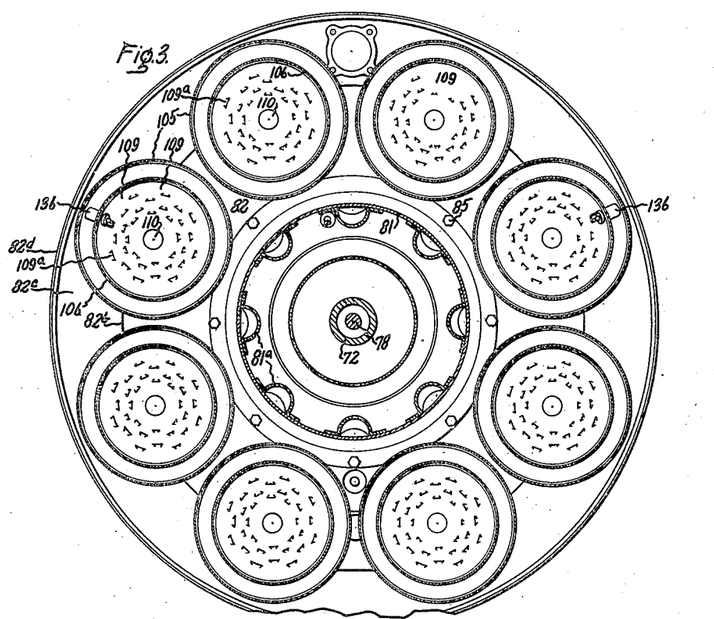
Fig. 3 is a transverse sectional view taken on the plane 3—3 in Fig. 2.

The wall 82 extends radially outward between and is connected to the transition section side walls, as may be seen in elevation in Fig. 3, and in dotted lines in Fig. 2. Thus wall 82 serves to stiffen the cast transition passage walls. At the outer circumference of wall 82, is an integral axially extending cylindrical wall portion 82b, also shown in dotted lines in Fig. 2. A third radially extending wall 82c terminates in a circumferential flange 82d, to which suitable fireproof baffles or shrouds may be attached when the powerplant is installed in a nacelle. It will be seen that the walls 82, 82b, 82c together define a continuous "firewall" separating the hot turbine and combustor sections from the comparatively cooler compressor section.

Coaxial with the circular discharge opening of each transition passage is a suitable fuel spray nozzle 110, which may be supported by fuel conduits 113 passing through and secured in a closure plate 61c for an opening formed in the outer wall 61a. This opening is proportioned so that the nozzle assembly 110, 113 can be readily removed simply by removing the threaded fastenings which secure plate 61c to wall 61a.

Referring further to Fig. 2, the turbine bucket-wheel 70 having a circumferential row of buckets 71 is carried on the end of a relatively long, hollow quill shaft 72. Adjacent the turbine wheel the shaft is supported in an aft bearing 73 the outer race of which is supported in an annular ring 74. The turbine wheel is thus "overhung" on the end of the shaft. The other end of shaft 72 is connected to shaft 13 (Fig. 1) and is thus supported in the mid-bearing 65. To this end, the hub of compressor wheel 14 is provided with an outer axially extending sleeve 75 on the outside of which the inner race of mid-bearing 65 is secured by a nut 76 and spacer 76a, and the inside of which is provided with splines 77 engaging mating splines on the end of shaft 72. It will be seen that the end of the bore in shaft 72 telescopes freely over the outer surface of the inner sleeve nut 20. Turbine wheel 70 and shaft 72 are secured in proper position axially by a tension member in the form of a long bolt 78 which at one end threads into sleeve nut 20 and at the other end receives a nut 79 engaging the outer surface of the wheel hub portion 70a. On the bolt 78 are a number of axially spaced rings 80, which may be attached to the rod by being shrunk thereon, and serve to maintain bolt 78 exactly concentric with shaft 72.

Turbine shaft 72 is surrounded by and enclosed in an "aft frame" structure comprising an aft frame cylinder 81 which at its forward end has an attachment flange bolted to ring 82a and at its rear end is connected to ring 74. In order to provide the necessary rigidity, the aft-frame cylinder 81 may be provided with a plurality of external longitudinally extending ribs, as disclosed in the above-mentioned application, Serial No. 541,565. However, in the present instance, this stiffening function is performed by circumferentially spaced axially extending sheet metal channels shown at 81a in Figs. 1 and 3. These channel members are welded to the inner surface of the cylinder 81 and define therewith closed passages, one or more of which may be used as a cooling and sealing air conduit communicating with a conduit 154, as shown in Fig. 2. By reason of these stiffening arrangements, the aft frame cylinder 81 is made sufficiently strong and rigid that the turbine and combustion section is completely supported from the mid-frame casing 51 by a ring of bolts 85 engaging the attachment flange 82a. It will be apparent from the drawings that this rigid aft-frame cylinder assembly serves to support the aft-bearing ring 74 from the mid-frame casing 51.

Secured to bearing support ring 74 is a turbine nozzle diaphragm support wall 87 reinforced by a conical wall 88 which at its rear end is secured to the circumference of wall 87 and at its forward end is welded to cylinder 81. Walls 87 and 88 form a support flange for the turbine nozzle diaphragm 89. Secured to wall 88 are circumferentially spaced radially projecting axially extending ribs 83a, 83b which are located between each pair of adjacent combustors. These ribs serve to stiffen the nozzle diaphragm support walls and the combustor support plate 129, described hereinafter.

The turbine nozzle diaphragm assembly 89 comprises circumferentially spaced nozzle partitions 90 shaped to define between them nozzles of the desired contour for directing hot gases from the combustors to the turbine wheel. At their radially outer ends nozzle partitions 90 are supported in a ring 91. As may be seen in Fig. 2, the outer nozzle diaphragm wall 91 is provided with circumferential flanges 91a, 91b at either end thereof and forms part of the exterior turbine casing structure. Secured to flange 91b is a cooperating flange member 93 to which is welded the outer wall 8 of the exhaust cone. Supported between the flanges 91b, 93 as by means of a rabbet fit, is a stationary shroud ring 92 for the shroudless or open-ended turbine buckets 71. This shroud is maintained concentric with the bucket-wheel by means of the above-mentioned rabbet fit with the nozzle ring 91, so as to maintain desirable close clearances with the open-ended buckets. Such a shroud arrangement is described more completely in United States Patent 2,427,244, issued September 9, 1947 on an application of Donald F. Warner, filed March 7, 1944 and assigned to the same assignee as the present application. At their radially inner ends the nozzle partitions are supported on an inner ring 94 secured to an annular wall 95 the inner periphery of which is secured to wall 87 by bolts 95a.

Turbine shaft 72 is relatively long; therefore to dampen any vibrations which tend to be set up in it, there is provided between bearings 65, 73 a vibration damping means comprising a roller bearing the inner race 96 of which is locked on shaft 72 by any suitable means, the outer race being carried in an annular retainer 97. Integral with holder 97 is a radially extending friction plate 98, the friction face of which engages a friction face on an annular plate 99 supported in cylinder 81. The friction surfaces are held in engagement by a plurality of spaced compression springs 100. This damper bearing serves to hold shaft 72 concentric with cylinder 81 when the combustion and turbine section of the powerplant is disconnected from the compressor section, as well as to dampen transverse vibrations of the shaft as described above. The combustors 5 are located between the discharge end of the midframe casing and the inlet end of the turbine. They are arranged in circumferentially spaced relation around aft frame cylinder 81, and, as will be seen from the drawings, are located substantially within the overall diameter of aftframe casing 6. In the present instance, eight combustion chambers are shown, but obviously any other suitable member could be used.

Referring now to Fig. 2, each combustor comprises an outer casing 105 and an inner "liner" 106, which are held in spaced relation to each other by suitable spacing clips (not shown) placed circumferentially around the periphery of the inner liner 106 so as to provide an annular air space 108. The forward end of inner liner 106 is closed by an end dome 109 having a central opening through which projects the end of the fuel nozzle 110. Outher combustor casing 105 is attached to the discharge end of transition section 61 by a suitable split ring or "clamp band" 114, which may be of any suitable type, for instance that shown in Patent No. 2,424,436, issued July 22, 1947, on an application of Wilbur D. Crater, filed April 13, 1945, and assigned to the same assignee as the present application. At the discharge end, combustor casing 105 is provided with a flange 124 which is secured by a clamp band 126 to a cooperating flange 125 formed at the end of a circular combustor support flange 127. Support flange 127 is welded to, or formed integral with an annular combustor support plate 129. Plate 129 extends entirely around the aft frame structure and is welded at its inner circumference to aft frame cylinder 81. Circumferentially spaced around the annular plate 129 are a plurality of openings surrounded by the combustor attachment flanges 127. At its periphery, plate 129 forms a bolting flange secured at 130 to the forward flange of the aft frame casing 6.

Thus it will be seen that the aft frame cylinder 81, nozzle diaphragm support walls 87, 88, stiffening ribs 83a, 83b, and the support plate 129 with the combustor attachment flanges 127 form a rigid unitary frame for supporting the combustors and turbine wheel from the midframe casing 51.

Figure 5:
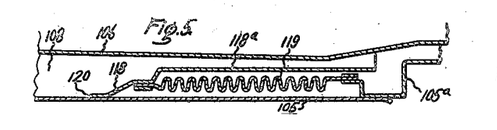
Fig. 5 is a detail sectional view on a larger scale showing a flexible arrangement for connecting together certain parts of the combustor structure.

In order to permit the necessary differential thermal expansion between the comparatively hot combustor casing and the comparatively cooler aft frame structure, a suitable flexible joint must be provided at one end of the outer casing 105. In the present case, this flexible arrangement is indicated at the discharge end of the combustor (Figs. 2 and 5) and comprises a separate end ring portion 105a secured to the attachment flange 124 and telescopically received in the open end of the casing 105. A suitable convoluted flexible bellows 119 has one end welded to the adjacent edge of ring 105a and the other end secured to an intermediate portion of a shield member 118, which is in turn welded to the outer casing 105 at 120 and has an opposite cylindrical end portion 118a. This shield is arranged to protect the bellows 119 from direct contact with the hot air flowing through the space 108, also serving as a radiation shield reducing the transfer of heat from the hot inner liner 106 to the flexible bellows, and defines a smooth surfaced passage for the flow of air around the discharge end portion of inner liner 106. With this arrangement it will be seen that the respective combustor attachment flanges 61b and 125 are fixed in space, while the outer combustor casing 105 is free to expand and contract by reason of its telescopic connection to the casing end ring 105a, this sliding joint being positively sealed by the flexible bellows 119.

The rear end of inner liner 106 projects inside flange 127 and is held in spaced relation thereto by a plurality of circumferentially spaced "dimples" 131 formed in the adjacent end of a transition piece 132 which conveys hot gases from the combustor to the nozzle diaphragm. Of course there is a transition piece 132 for each combustor. At their admission ends these are round and located within the support flanges 127. From the admission end their walls diverge in a circumferential direction and converge in a radial direction to an extent such that their discharge ends together form a substantially continuous annular discharge passage for supplying hot gases to the nozzle ring. This is shown best in Fig. 4. At their discharge ends they have a suitable sliding connection with outer nozzle ring 91 and inner ring 94. The transition pieces 132 may be held in position relative to the nozzle diaphragm by means of two or more circumferentially spaced dowel pins 133 projecting through cooperating flanges extending inwardly from the aft frame casing 6 and outwardly from the adjacent end of the transition piece. The radially inner wall of the transition piece 132 may be held in position relative to the inner nozzle ring 94 by means of circumferentially spaced "dimples"

Figure 4:
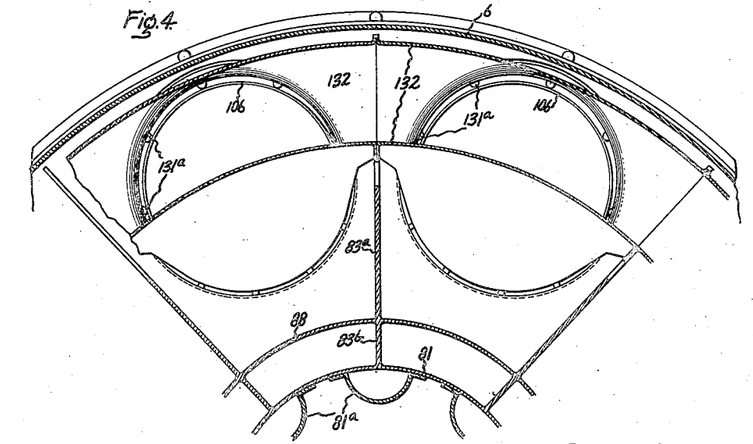
Fig. 4 is a detail sectional view on a larger scale taken on the irregular plane 4—4 in Fig. 2.

135 formed in a circumferentially extending flange secured to inner nozzle ring 94.

In inner liner 106 are suitably arranged openings 134 for flow of air from the annular supply space 108 to the interior of liner 106. At 136 is a suitable ignition plug for initiating combustion. Air for cooling the end dome 109 and inner liner 106 is admitted through a plurality of cooling air louvers 134a, 109a. For simplicity, only a few of the openings 134, 134a are shown in the drawings. This combustor arrangement will be recognized as one of the so-called "Nerad type" combustors covered by an application, Serial No. 750,015, filed May 23, 1947, as a continuation-in-part of Serial No. 501,106, filed September 3, 1943, now abandoned, both applications being assigned to the same assignee as the present application. Further details of the construction and method of operation of this combustor are not necessary to understanding the present invention.

For cooling the turbine parts air is taken through the conduit 154 communicating with one of the channel members 81a and from there flows as indicated by the arrows in Fig. 2, so as to cool the inlet side of the turbine wheel 70. Additional air extracted from a suitable stage of the compressor is supplied to the discharge side of the turbine wheel by a conduit 155, which communicates with conduit 155a extending across the hot gas discharge passage and surrounded by a stream-lined shield 174. The inner cone 171 may be supported by a plurality of suitable tubular struts 173 which may also be enclosed in shield 174. For cooling the downstream side of the bucket-wheel 70, cooling air from conduit 155a flows into a chamber formed by the sheet metal walls 156, 157, thence into the circumferential space 158 defined between the plates 156, 157, and the outer circumferential portion of an annular shroud 175. From space 158, a blast of air is directed at the rim of the bucket-wheel through arcuate slots as indicated at 159.

Because not material to an understanding of the present invention, the piping for supplying fuel oil to the nozzle 110 and lubricating oil to the respective bearings is not shown. It will be obvious to those skilled in the art that many fuel supply systems and lubricating arrangements may be employed.

The method of operation of this powerplant is described in detail in my above-mentioned application Serial No. 541,565, and need not be repeated here.

The present invention provides a novel axial flow turbo-machine rotor arrangement particularly suited for axial flow compressors in powerplants of the type described, which combines in a desirable manner the strength characteristics of the so-called disk type rotor with the good critical speed characteristics of the drum type rotor. At the same time my improved rotor construction is comparatively easy to fabricate and disassemble for cleaning, replacement of damaged buckets, etc. It will be appreciated that this rotor construction is applicable to multi-stage turbo-machines generally, turbines as well as compressors.

While I have described a particular form of the invention, it will be understood by those skilled in the art that many of the mechanical details may be altered in various ways, and I desire to cover by the appended claims all such modifications as fall within the true spirit and scope of the invention.

What I claim as new and desire to secure by Letters Patent of the United States, is:

1. A rotor for a multi-stage axial flow turbo-machine having a casing and axially spaced bearings for supporting the rotor, said rotor comprising a shaft with a circumferential shoulder adjacent one end and a reduced diameter threaded portion at the other end, a plurality of coaxial axially spaced disk members each having a central bore through which the shaft passes and a rim portion carrying a plurality of circumferentially spaced blades, the hub portion of the disk at one end of the rotor engaging said shoulder on the shaft and the disk at the opposite end having associated therewith key means for positively transmitting torque from the shaft to said last-mentioned disk, a nut member threadedly received on the end of the compressor shaft and engaging the hub portion of said last end disk, and a plurality of spacer rings located between the rim portions of the respective disks, said spacers defining a rabbet fit with adjacent edges of the compressor disk rims, the aggregate axial length of said compressor disk rim portions and spacers measured center-to-center between the end disks being greater than the corresponding axial dimensions of the hub portions of the disks, whereby with the nut member tightened the web portions of at least some of the disks are deflected from a radial plane so that the disk rims and spacers are forced axially into tight engagement with each other and centrifugal force tends to increase the friction of the driving connections, through the tendency of the disk webs to move into an exactly radial plane at high speeds.

2. A rotor for a multi-stage axial flow turbo machine having a casing and axially spaced bearings for supporting the rotor, said rotor comprising a shaft with a circumferential shoulder adjacent one end and a reduced diameter threaded portion at the other end, a plurality of coaxial axially spaced disk members each having a central bore through which the shaft passes and a rim portion carrying a plurality of circumferentially spaced blades, the disk at one end of the rotor engaging said shoulder of the shaft and the disk at the opposite end being provided with key means for transmitting torque from the shaft to said last-mentioned disk, a nut member threadedly received on the end of the compressor shaft and engaging the hub portion of said last-mentioned end disk, a plurality of spacer rings located between the rim portions of the respective disks, said spacers defining a rabbet fit with adjacent edges of the compressor disk rims, a plurality of hub spacer members located between the respective disk hub portions, the aggregate axial length of said compressor disk rim portions and rim spacers measured center-to-center between the end disks being greater than the corresponding axial dimensions of said hub and hub spacer members, whereby with the nut member tightened the web portions of at least some of the disks are deflected from a radial plane so that the disk rims and spacers are forced axially into tight engagement with each other and centrifugal force tends to increase the friction of the driving connection through the tendency of the disk webs to move into an exactly radial plane at high speeds.

3. In a high-speed rotor having a shaft with a plurality of axially spaced wheels mounted on the shaft with their rims in spaced relation to each other, the combination of a spacer ring located between a pair of adjacent rim portions and having at either side thereof an annular outwardly facing surface frictionally engaging a cooperating inwardly facing annular surface of the adjacent rim portions, a plurality of axially extending dowel pins connecting one side of the ring to one adjacent wheel rim, the other side of the ring defining an inwardly facing circumferential surface forming with the other adjacent disk rim a circumferential groove opening in an axial direction toward the first mentioned wheel, and an annular calking strip wedged into said groove to increase the frictional contact between the ring and said other rim.

4. A rotor for a turbo-machine comprising a shaft with first abutment means adjacent one end thereof, a plurality of axially spaced disk members each having a hub portion defining a central bore through which the shaft passes and a radially extending web with a rim portion, there being no connecting member between the web portions, the hub of the disk at one end of the rotor engaging the first abutment, second abutment means associated with the other end of the shaft and engaging the hub portion of the adjacent end disk at a radius immediately adjacent the shaft, and a plurality of spacer rings located between the rim portions of the respective disks, each of said spacers having circumferential edge portions defining a rabbet fit with the adjacent rims, the aggregate axial length of said rim portions and spacers measured center-to-center between the end disks being greater than the corresponding axial dimension of the hub portions of the disks, whereby in the assembled position of said first and second abutments the center-to-center dimension between the end disk hub portions is less than the corresponding dimension of the rims so that the webs of at least certain of the disks are deflected from a radial plane to a dished configuration and the rims are pre-stressed into tight axial engagement with each other, whereby centrifugal force acting on the dished disks at high speeds produces a tendency of said disks to return to an exactly radial plane and thereby increases the friction between the disk rims and spacers.

5. A turbo-machine rotor comprising a shaft carrying a plurality of essentially radial disks having circumferential rim portions, comparatively thin web portions, and axially spaced hub portions each defining a bore through which the shaft passes, spacer ring members located between the rim portions of the respective pairs of disks, there being no connecting members between the web portions of adjacent disks and a substantial portion of the torque transmission between disks being through frictional contact between the edges of said rim portions and spacers, first and second axially spaced abutment means associated with the shaft and engaging the outer surfaces of the hub portions of the extreme end disks at a radius immediately adjacent the shaft, the center-to-center distance between the end disk hub portions being less than the corresponding dimension of the rim portions, with which relation at least one of said end disks assumes a somewhat dished configuration with its hub portion displaced from the normal centerline of the disk axially towards the next adjacent disk hub portion and its web portion deviating from a true radial plane whereby under the action of centrifugal force at high speed said dished disk tends to deflect into the radial plane to bring the wheel rims and spacer rings into tighter frictional engagement for improved torque transmitting capacity.

ALAN HOWARD.

REFERENCES CITED

The following references are of record in the file of this patent:

UNITED STATES PATENTS

| Number | Name | Date |
| --- | --- | --- |
| 2,213,940 | Jendrassik | Sept. 3, 1940 |
| 2,241,782 | Jendrassik | May 13, 1941 |
| 2,371,706 | Planiol | Mar. 20, 1945 |

FOREIGN PATENTS

| Number | Country | Date |
| --- | --- | --- |
| 402,525 | Germany | Sept. 20, 1924 |